United States Patent [19]

Höhlein et al.

[11] Patent Number: 5,260,138
[45] Date of Patent: Nov. 9, 1993

[54] COATING COMPOSITION AND ITS USE FOR THE PRODUCTION OF COATINGS

[75] Inventors: Peter Höhlein, Kempen; Keith-Allen Foster, Meerbusch-Bösinghoven, both of Fed. Rep. of Germany

[73] Assignee: Bayer Aktiengesellschaft, Leverkusen, Fed. Rep. of Germany

[21] Appl. No.: 811,342

[22] Filed: Dec. 20, 1991

[30] Foreign Application Priority Data

Jan. 5, 1991 [DE] Fed. Rep. of Germany ....... 4100204

[51] Int. Cl.$^5$ ............................................. C08L 67/02
[52] U.S. Cl. ................................... 428/480; 525/440; 525/124; 525/28; 525/437
[58] Field of Search .................... 525/440; 428/480

[56] References Cited

U.S. PATENT DOCUMENTS

| 4,076,766 | 2/1978 | Simms | 260/850 |
| 4,101,530 | 7/1978 | Burkhardt et al. | 528/45 |
| 4,373,081 | 2/1983 | Nachtkamp et al. | 528/45 |
| 4,576,868 | 3/1986 | Poth et al. | 428/423.1 |
| 4,742,129 | 5/1988 | Kordomenos et al. | 525/438 |
| 4,952,626 | 9/1990 | Kordomenos et al. | 525/28 |
| 4,968,775 | 11/1990 | Toman et al. | 528/272 |

FOREIGN PATENT DOCUMENTS 1518495 7/1978 United Kingdom .

Primary Examiner—James J. Seidleck
Assistant Examiner—Mary Critharis
Attorney, Agent, or Firm—Joseph C. Gil; Thomas W. Roy

[57] ABSTRACT

The present invention relates to a coating composition which is liquid and storable at room temperature and wherein the binder is based on a mixture of A) a cross-linking component containing at least one amino resin and/or at least one blocked polyisocyanate and B) a polyester component containing at least one hydroxyl- and carboxyl-functional polyester which also contains olefinic double bonds incorporated through unsaturated dicarboxylic acids. The present also related to coated substrates prepared from this coating composition.

8 Claims, No Drawings

COATING COMPOSITION AND ITS USE FOR THE PRODUCTION OF COATINGS

BACKGROUND OF THE INVENTION

1. Field of the Invention

This invention relates to a new liquid, storable coating composition which is suitable for the production of highly UV-stable coatings wherein the binder contains a special polyester component having saturated and unsaturated units and, as the curing agent, an amino resin or a blocked polyisocyanate, and to the use of the coating composition for the production of coatings on heat-resistant substrates.

2. Description of the Prior Art

One-component stoving lacquers based on polyisocyanates containing blocked isocyanate groups and their use for the production of polyurethane are known (cf. for example Kunststoff-Handbuch, Vol. VII, Polyurethane, Carl Hanser Verlag München (1966), pages 11-13, 21 et seq).

When blocked polyisocyanates of this type are used in combination with hydroxyl polyesters, the following main requirements have to be satisfied:

1) relatively low unblocking temperatures for short stoving times,
2) little or no yellowing during stoving and in the event of brief overstoving,
3) adequate stability in storage of the one-component lacquers,
4) no elimination of toxicologically harmful decomposition products.

These requirements can be satisfied by special stoving binders based on hydroxyl polyesters and blocked polyisocyanates of the type described in DE-OS 2,550,156.

It is apparent from DE-PS 3,046,409 that the stoving binders according to DE-OS 2,550,156 cannot be used for the production of coatings on surfaces for industrial goods which are exposed to impact stresses, such as machine parts, motor vehicle bodies or transport containers.

Although the stoving binders according to DE-PS 3,046,409 provide impact-resistant coatings, they are unable to meet normal requirements in regard to weather stability. Accordingly, they are unsuitable for coating surfaces exposed to extreme weathering influences, such as motor vehicle bodies, facing panels, etc., which have to meet stringent requirements in regard to mechanical properties and resistance to solvents, such as gasoline.

One-component stoving binders based on hydroxyl polyesters and amino resins also do not fully satisfy the stated requirements. However, after stoving they do result in lacquer films which are distinguished by a favorable hardness-to-elasticity ratio and by good adhesion. Binder compositions of this type are described in DE-AS 2,621,657 and may be applied by the automatic coil coating method. The requirements which one-component stoving lacquers, which are based on hydroxyl polyesters and blocked polyisocyanates or amino resins as crosslinking component, have to satisfy today go beyond the described level. Automatic coil coating requires stoving lacquers having weathering properties which are good enough for the pigmented lacquer films to be able to withstand even short-wave UV light for prolonged periods without yellowing or cracking coupled with high surface gloss of the lacquer films. The mechanical properties of the coatings must not show any disadvantages when compared to known films. A high standard is also expected for the abrasion resistance of the lacquer film surface. The use of less solvent is another requirement. The state-of-the-art lacquer systems mentioned above do not fully satisfy these requirements.

It has now been surprisingly found that the coating compositions described in detail hereinafter based on known curing agents and a special polyester component provide lacquer films which not only combine high hardness and elasticity with good adhesion to metal and good abrasion resistance, but also provide lacquer films which withstand exposure to short-wave UV light for more than 1,250 h without cracking or yellowing in the absence of light stabilizers. After stoving, the coating compositions according to the invention result in high-gloss lacquer films which, in addition to excellent adhesion to metallic substrates, also possess high hardness and extreme deformability. The last of these properties is particularly desirable in the case of coating compositions which are applied by automatic coil coating or which are used as non-chip coatings in the automotive field.

The coating compositions according to the invention may be applied in high concentrations and enable environmental pollution to be reduced through the relatively minimal use of solvent.

SUMMARY OF THE INVENTION

The present invention relates to a coating composition which is liquid and storable at room temperature and is based on a binder which contains A) 2.5 to 40% by weight, based on the weight of components A) and B), of a crosslinking component containing at least one amino resin and/or at least one blocked polyisocyanate and B) 60 to 97.5% by weight, based on the weight of components A) and B), of a polyester component containing at least one hydroxyl- and carboxyl-functional polyester, wherein component B) has an average molecular weight ($M_n$) of 500 to 10,000, a hydroxyl value of 20 to 300, an acid value of 1 to 80 and is based on the reaction product of a1) at least one dihydric aliphatic or cycloaliphatic $C_{2-12}$ alcohol and
a2) at least one aliphatic or cycloaliphatic trihydric or higher functionality $C_{3-8}$ alcohol with
b1) at least one saturated, aliphatic or cycloaliphatic dicarboxylic acid and/or at least one anhydride of such acid and
b2) at least one olefinically unsaturated, aliphatic or cycloaliphatic dicarboxylic acid containing at least 4 carbon atoms and/or at least one anhydride of such acid.

The present invention also relates to the use of this coating composition for the production of heat-cured coatings on heat-resistant substrates.

DETAILED DESCRIPTION OF THE INVENTION

The binders of the coating compositions according to the invention contain 2.5 to 40% by weight, preferably 5 to 30% by weight of crosslinking component A) and 60 to 97.5% by weight, preferably 70 to 95% by weight of polyester component B), based on the weight of components A) and B).

The crosslinking component A) contains at least one amino resin and/or at least one blocked polyisocyanate.

Melamine/formaldehyde or urea/formaldehyde condensates are suitable amino resins. Suitable melamine resins are any conventional non-etherified melamine/formaldehyde condensates or melamine/formaldehyde condensates etherified with saturated $C_{1-4}$ alcohols of the type described, for example, in FR-PS 943,411 or in D. H. Solomon, The Chemistry of Organic Film Former, 235-240, John Wiley & Sons, Inc., New York, 1967. However, the melamine resins may also be completely or partly replaced by other crosslinking aminoplastics of the type described, for example, in "Methoden der Organischen Chemie" (Houben-Weyl), Vol. 14/2, Part 2, 4th Edition, Georg Thieme Verlag, Stuttgart, 1963, 319 et seq.

Blocked polyisocyanates based on aromatic polyisocyanates are unsuitable for use in accordance with the present invention due to the high level of weathering resistance required for the lacquers according to the invention. Instead, suitable blocked polyisocyanates for the purposes of the invention are blocked polyisocyanates based on light-stable, aliphatic and/or cycloaliphatic polyisocyanates, such as 1,6-diisocyanatohexane, 1-isocyanato-3,3,5-trimethyl-5-isocyanatomethyl cyclohexane (isophorone diisocyanate or IPDI), cyclohexane diisocyanate, tetramethyl cyclohexane diisocyanate, 4,4'-diisocyanatodicyclohexyl methane, 2,4'-diisocyanatodicyclohexyl methane and mixtures thereof. Polyisocyanate adducts prepared from these diisocyanates and containing biuret groups, allophanate groups, carbodiimide groups, uretdione groups or isocyanurate groups may also be used as the crosslinking component after reversible blocking of the free isocyanate groups. These polyisocyanate adducts are described, for example, in EP-0,003,505, DE-PS 1,101,394, U.S. Pat. No. 3,358,010U.S. Pat. No. 3,903,127, U.S. Pat. No. 4,324,879, U.S. Pat. No. 4,288,586, DE-OS 3,100,262, DE-OS 3,100,263, DE-OS 3,033,860 and DE-OS 3,144,672 (the U.S. patents are herein incorporated by reference).

To produce the reversibly blocked polyisocyanate component, the isocyanates or mixtures thereof are preferably reacted with blocking agents, such as ε-caprolactam, butanone oxime, acetone oxime, malonic acid diethyl ester or acetoacetic acid ethyl ester, so that complete blocking of the free isocyanate groups is generally obtained.

The blocking reaction of the free isocyanate groups with ε-caprolactam or butanone oxime takes place at temperatures of preferably 100° to 130° C., as described for example in DE-OS 3,004,876. This reaction is preferably conducted in the presence of 0.01 to 0.1% by weight, based on the weight of the mixture of catalysts, e.g., organotin compositions or certain tertiary amines such as triethylene diamine.

The blocking reaction with malonic acid esters or acetoacetic acid esters takes place in known manner (cf. DE-OS 2,342,603 or 2,550,156) using basic catalysts such as sodium phenolate, sodium methylate or other alkali alcoholates. Other organic alkali metal compositions, such as sodium malonate, may also be used. The catalysts are used in a quantity of 0.1% to 2%, based on the total weight of the reaction components. The dialkyl malonate should be used in a quantity of at least 1 mole per isocyanate equivalent. However, it is preferred to use a 5 to 20% excess of the blocking agent.

It is also possible in accordance with the present invention to prepare a polyisocyanate which corresponds to component A) by only blocking 40 to 90% of the isocyanate groups and subsequently reacting the partly blocked polyisocyanate with a polyol suitable for use as component B). Compositions of components A) and B) according to the invention may be produced not only by mixing the individual components as described below, but also by partly blocking unblocked polyisocyanates or polyisocyanate mixtures, so that for example up to 30% of the NCO groups are present in free form. These partially blocked polyisocyanate may then be mixed with polyester polyols suitable for use as component B) in such a quantity that after the addition reaction between the free NCO groups and a portion of the hydroxyl groups of the polyester polyol, a mixture is obtained which contains blocked polyisocyanates and excess polyester polyol B) in the equivalent ratio of blocked NCO groups to hydroxyl groups of 0.6:1 to 2:1 which is preferred according to the invention. In accordance with this embodiment component A) is the above-mentioned reaction product between the partly blocked polyisocyanate and the polyester polyol.

The blocking reaction may be carried out in the absence of solvents or in the presence of solvents which are inert to isocyanate groups. Suitable solvents which are inert to polyisocyanates include methyl glycol acetate, ethyl glycol acetate, diethyl glycol monomethyl ether acetate, methyl ethyl ketone, methyl isobutyl ketone, toluene, xylene and the mixtures of relatively high-boiling hydrocarbons which are known from polyurethane coatings chemistry.

The above-mentioned solvents may be used individually or in admixture. Instead of using solvents, it is also possible to use plasticizers, such as commercially available phosphoric acid esters, phthalic acid esters or sulfonic acid esters.

Blocked polyisocyanates which may be used in accordance with the invention as component A) are also described in DE-OS 2,342,603, 2,436,872, 2,550,156, 2,612,783, 2,612,784 and 2,612,785.

Mixtures of blocked polyisocyanates and amino resins may also be used as component A) in the coating compositions according to the invention.

Component B) of the coating compositions according to the invention is a polyester having an average molecular weight ($M_n$) of 500 to 10,000, preferably 800 to 5,000 and more preferably 1,000 to 3,000; a hydroxyl value of 20 to 300, preferably 25 to 250 and more preferably 30 to 100: and an acid value of 1 to 80, preferably 1 to 30 and more preferably 1 to 10. The polyesters are prepared by polycondensation of alcohol components a1) and a2) and acid components b1) and b2).

Suitable dihydric, aliphatic and/or cycloaliphatic alcohols a1) include those containing 2 to 8 carbon atoms, such as ethylene glycol, propane-1,2-diol and/or propane-1,3-diol, butane-1,2-diol and butane-1,4-diol, pentane-1,5-diol, hexane-1,6-diol, neopentyl glycol, 1,4-cyclohexane dimethanol and mixtures of these diols.

Suitable trifunctional and higher functionality alcohols a2) include those containing 3 to 8 carbon atoms, such as trimethylol propane, glycerol, pentaerythritol and mixtures of these polyhydric alcohols.

Suitable saturated, aliphatic or cycloaliphatic dicarboxylic acids or dicarboxylic anhydrides b1) include oxalic acid, succinic acid, glutaric acid, adipic acid, pimelic acid, suberic acid, azelaic acid, hexahydrophthalic acid, the anhydrides of these acids and mixtures of these acids and/or anhydrides.

Suitable unsaturated, aliphatic or cycloaliphatic dicarboxylic acids or anhydrides b2) include fumaric acid, maleic acid, itaconic acid, tetrahydrophthalic acid, the anhydrides of these acids and mixtures of these acids and/or anhydrides.

The use of component b2) in an amount which is sufficient to provide at least 3.2% by weight, preferably 4.5 to 8.5% by weight of olefinic double bonds (expressed as C=C, molecular weight=24) in the resulting polyester component B), is critical to the invention. Preferred are polyesters which have been obtained by reacting 30 to 53 parts by weight of a1), more preferably a mixture of 30 to 50 parts by weight of neopentyl glycol and 1 to 3 parts by weight of propane-1,2-diol and/or ethylene glycol; 2 to 10 parts by weight of a2), more preferably trimethylol propane; 15 to 35 parts by weight of b1), more preferably adipic acid; and 20 to 40 parts by weight of b2), more preferably maleic acid, tetrahydrophthalic acid and/or anhydrides of these acids, wherein the total parts by weight add up to 100.

The polyesters are prepared by known methods as described in detail, for example, in "Ullmanns Encyclopädie der technischen Chemie", Verlag Chemie Weinheim, 4th Edition (1980), Vol. 19, pages 61 et seq, or by H. Wagner and H. F. Sarx in "Lackkunstharze", Carl Hanser Verlag, München (1971), pages 86 to 152.

The esterification reaction is optionally carried out in the presence of a catalytic quantity of a typical esterification catalyst, such as titanium tetrabutylate, at approximately 80° to 260° C., preferably 100° to 230° C. The esterification reaction is continued until the desired hydroxyl and acid values are obtained.

The polyester resins according to the invention have a number average molecular weight ($M_n$, as determined by size exclusion chromatography using polystyrene as standard) within the limits indicated.

To produce the binders present in the coating compositions according to the invention using only blocked polyisocyanates as component A), polyisocyanate component A) and polyester component B) are mixed in an amount which correspond to an equivalent ratio of blocked isocyanate groups to hydroxyl groups of 0.6:1 to 2:1, preferably 0.9:1 to 1.4:1. It is important to ensure that the components are mixed at a temperature below the temperature which the blocked NCO groups are capable of reacting with the OH groups.

As already mentioned, the coating compositions according to the invention may contain other auxiliaries and additives in addition to the essential binder components A) and B). These other auxiliaries and additives include other organic polyhydroxyl compounds known from polyurethane technology which do not correspond to the definition of B), such as polyester, polyether or, preferably, polyacrylate polyols. Examples of polyacrylate polyols include those copolymers which are soluble in the lacquer solvents used in accordance with the invention and prepared from mixtures of 2-hydroxyethyl and/or 2- or 3-hydroxypropyl acrylate or methacrylate with other olefinically unsaturated monomers such as methyl acrylate, methyl methacrylate, styrene, acrylic acid, acrylonitrile, methacrylonitrile or mixtures of such monomers.

These other polyhydroxyl compounds, which do not correspond to the definition of B), may be used in quantities of up to 50 hydroxyl equivalent-%, based on the total quantity of hydroxyl-functional compounds present in the coating compositions. When these other polyhydroxyl compounds are used, the quantity of crosslinking component A) must of course also be increased accordingly to be within the ranges specified. In the particular case where blocked polyisocyanates are used as component A), the quantity in which they are used must be gauged in such a way that the equivalent ratio of blocked isocyanate groups to hydroxyl groups is at least 0.6:1. The use of polyols that do not correspond to the definition of B) is not preferred.

Other auxiliaries include solvents which have a boiling point of at least 75° C. or a boiling range above 75° C. The upper limit of the boiling point or the boiling range of the particular solvent used is dependent upon the particular stoving conditions applied, i.e., the higher the stoving temperature, the higher the boiling temperature of the solvent. Suitable solvents include aromatic hydrocarbons such as toluene, xylene, tetralin, cumene and commercial mixtures of aromatic hydrocarbons having narrow boiling ranges (e.g., Solvesso 100, 150 and 200 solvents which are available from Exxon); ketones such as methyl isobutyl ketone, diisobutyl ketone and isophorone; and esters such as n-hexyl acetate, ethyl glycol acetate, ethyl acetate and n-butyl acetate; and mixtures of such solvents.

The solvents may either be added during the production of the blocked polyisocyanates A) or at a later stage. It must be emphasized that for the production of highly weather-resistant coil coatings, the coating compositions according to the invention are preferably processed in low-solvent form, even though larger quantities of solvent may be used. Accordingly, the coating compositions according to the invention preferably have solids contents of more than 55% by weight.

Other auxiliaries and additives which may optionally be present in the coating compositions according to the invention include the previously mentioned plasticizers, pigments, fillers, flow control agents and catalysts which accelerate the crosslinking reaction.

The curing of polyester/aminoplastic binders is known to be accelerated by addition of acids. When polyesters having a very low acid number are used, acidic catalysts may be added to the coating compositions according to the invention. For example, curing is greatly accelerated by addition of p-toluene sulfonic acid in a quantity of 0.5% by weight, based on the weight of components A) and B).

An anhydride of a relatively acidic dicarboxylic acid, such as maleic anhydride, may also be added to polyesters having a low acid value in an amount of about 1 to 5% by weight, based on the weight of the polyester, in order to subsequently increase the acid value and thus to reduce the stoving temperatures even without the addition of acidic catalysts.

The coating compositions according to the invention are mixtures which are liquid and storable at room temperature.

To produce coatings using the coating compositions according to the invention, the coating compositions are applied to heat-resistant substrates in one or more layers known methods, for example, by spray coating, dip coating, flood coating, roll coating or knife coating. The coating compositions according to the invention are suitable for the production of coatings on metal, plastics, wood and glass. The coating composition according to the invention is particularly suitable for the production of coatings on strip aluminum and steel which are coated by automatic coil coating and which are used as motor vehicle bodies, housings for machines and domestic appliances, cladding panels, drums and containers. The substrates to be coated may be suitably primed before coating. In accordance with the invention, the quantity of coating composition is generally selected so that dry layer thicknesses of about 5 to 50 μm are obtained. However, the coating composition may also be applied in considerably thicker layers.

Depending upon the application, the lacquers according to the invention are cured for 0.25 to 45 minutes, preferably 0.50 to 35 minutes at a temperature of 90° to 500° C., preferably 110° to 430° C. The cured coatings show excellent lacquer properties and are preferably used as weather-resistant one-layer and two-layer lacquer coatings for coils.

The surface protection obtainable in accordance with the invention is demonstrated in the following examples in which all the parts and percentages are by weight unless otherwise indicated.

The Hazen color value indicated in some of the examples of the invention is generally used to indicate the color of very light-colored substances whereas the iodine color value is used to indicate the color of more deeply colored substances. Thus an iodine color value of 1 corresponds to a Hazen color value of about 100 apha.

EXAMPLES

Example 1

103 g of propane-1,2-diol, 2,167 g of neopentyl glycol, 273 g of trimethylol propane and 1,334 g of maleic anhydride were weighed into a 5 liter stirred tank equipped with a stirrer, a distillation bridge and a nitrogen inlet pipe and heated to 125° C. During the heating phase, nitrogen was passed through in a quantity equal to the tank volume/h. 1,152 g of adipic acid were added at 125° C., the throughput of nitrogen was increased to twice the tank volume per hour and the contents of the tank were heated with stirring to 180° C. over a period of 6 hours. After about 36 h, 4,500 g of a polycondensation product having an acid value of 5.9 mg KOH/g resin, an OH value of 89 mg KOH/g resin and a Hazen color value of 40 apha were obtained. 3,150 g of this resin were introduced into 1,350 g of Solvesso 100 solvent (available from Exxon), resulting in a solution having a solids content of 70.0% and a viscosity of 2,144 mPa.s, as measured at 23° C. in a Haake Rotovisko RV 20 rotational viscosimeter.

Example 2

103 g of propane-1,2-diol, 2,044 g of neopentyl glycol, 387 g of trimethylol propane, 1,157 g of adipic acid and 1,340 g of maleic anhydride were reacted in a polycondensation reaction under the same conditions as in Example 1. The resulting resin solution in Solvesso 100 solvent had a viscosity of 6,454 mPa.s, a solids content of 70.6%, an acid value of 4.1 mg KOH/g, an OH value of 63 mg KOH/g and a Hazen color value of 70 apha.

Comparison Example 133 g of propane-1,2-diol, 2,470 g of neopentyl glycol and 646 g of trimethylol propane were weighed into a 10 liter stirred tank equipped as described in Example 1 and heated to 120° C. while nitrogen was passed through at a rate of 10 l/h. 1,495 g of adipic acid and 2,931 g of isophthalic acid were then added with stirring and the mixture was heated with stirring to 220° C. over a period of 6 h during which nitrogen was passed through. After an acid value of 5.6 mg KOH/g and a flow viscosity of 85 seconds (DIN 53 211; 4 mm orifice, as measured in a 50% solution in ethyl glycol acetate) had been reached, the resin was dissolved at 60° C. in a mixture of Solvesso 100 solvent and isobutanol in a ratio of 9:1.

A 65% solution of the resin had a viscosity of 3,670 mPa.s, an OH value of 39 mg KOH/g and an iodine color value of 3.

Example 3

88 g of propane-1,2-diol, 1,969 g of neopentyl glycol, 137 g of trimethylol propane, 987 g of adipic acid and 1,772 g of tetrahydrophthalic anhydride were reacted in a polycondensation reaction under the conditions of Example 1. Dissolution of 3,375 g of the resin in 1,125 g of Solvesso 100 solvent resulted in a resin solution having a viscosity of 2,133 mPa.s, a solids content of 74.9%, an acid value of 4.2 mg KOH/g, an OH value of 60 mg KOH/g and a Hazen color value of 30 apha.

Example 4

103 g of propane-1,2-diol, 2,305 g of neopentyl glycol, 161 g of trimethylol propane, 998 g of adipic acid and 1,444 g of maleic anhydride were reacted in a polycondensation reaction under the conditions of Example 1. Dissolution of 3,375 g of the resin in 1,125 g of Solvesso 100 solvent resulted in a resin solution having a solids content of 74.7%, a viscosity of 2,660 mPa.s, an acid value of 4.3 mg KOH/g, an OH value of 68 mg KOH/g and a Hazen color value of 35 apha.

Example 5 (use)

This Example describes the production of ready-to-use coating compositions based on the polyester polyols of Examples 1 to 4 and the Comparison Example, their application and the testing of the resulting coatings.

To evaluate the general coating properties, white coatings were produced by incorporating various additives and white pigment in the polyester polyols of Examples 1 to 4 and the Comparison Example.

A blocked, light-stable polyisocyanate was then added in an amount sufficient to provide an NCO:OH equivalent ratio of approximately 1:1. The first blocked polyisocyanate (BL I) was a 75% solution in Solvesso 100 solvent of a butanone oxime-blocked isocyanurate polyisocyanate obtained by trimerizing hexamethylene diisocyanate said solution having a content of masked NCO groups (expressed as NCO, molecular weight=42) of 11.1%. The second blocked polyisocyanate (BL II) was a 65% solution in Solvesso 100 solvent of a butanone oxime-blocked isocyanurate polyisocyanate obtained by trimerizing isophorone diisocyanate (IPDI) and having an NCO content of the solution of 8.1%.

The following quantities of additives were used, based on solid resin (weight of the solid components of polyol and polyisocyanate):

TABLE 1

| Constituents | % by weight solid to solid |
|---|---|
| Dibutyl tin dilaurate (Oxydo GMbH. Emmerich) as catalyst. 10% in Solvesso 200 solvent | 1.0 |
| Cellulose acetobutyrate. CAB 531-1 (a product of Krahn Chemie. Hamburg). 10% in Solvesso 200 solvent/butyl diglycol (ratio of solvents 2:1) | 2.4 |

TABLE 1-continued

| Constituents | % by weight solid to solid |
|---|---|
| Flow control agent (Acronal 4 F, a product of BASF AG, Ludwigshafen), 50% in Solvesso 200 solvent | 2.4 |

Titanium dioxide (rutile; Bayertitan R-KB-4, available from Bayer AG) was added in a ratio of 1:1, based on solids (weight of polyester polyol and blocked polyisocyanate) and the composition was homogenized in a bead mill.

The white coating composition formed was diluted by the addition of Solvesso 200 solvent to a flow viscosity (DIN 4 mm cup, DIN 53 211) of approx. 70 seconds, applied in a wet film layer thickness of approx. 40 to 50 μm to primed aluminum panels measuring 68 mm×150 mm (Alodine 1200 panels, available from Henkel-Technimetal, Cologne), stoved in a recirculating air stoving oven for 55 to 60 seconds at an oven temperature of 300° C. (which corresponded to an average object temperature of approximately 232°–241° C.) and immediately cooled in luke-warm water. Tests were then conducted to determine Buchholz hardness (DIN 53 153, ECCA* T 12), Gardner gloss at angles of 20° and 60° (DIN 67 530, ECCA* T 2), whiteness (DIN 6174, ECCA* 23), solvent resistance using the MEK rubbing test (NCCA* Standard II-15, 2 kg load), adhesion using the crosshatch test, 6 mm penetration (DIN 53 151, ECCA* T 6) and the impact test (DIN 55 669, ECCA* T 5), elasticity (T-bend test according to NCCA* Standard II-19, T 0-most severe, T 5, least severe) and abrasion resistance (DIN 53 754; 500 cycles, 500 g of loads, CS-10 stones).

* ECCA = European Coil-Coating Association
* NCCA = National Coil-Coating Association (USA)

The results obtained are listed in Table 2.

The weather resistance of coatings is often tested by accelerated weathering tests to enable comparative assessments to be made more quickly. Accordingly, the test specimens were exposed to intensive radiation and moisture which only a few materials withstand without damage. However, since good results are increasingly expected in these tests today, the object of the present invention was to provide lacquers using suitable new polyester polyols which, in addition to a good general property level (elasticity, gloss, adhesion, abrasion resistance, resistance to chemicals, etc.), would show distinctly improved resistance to accelerated weathering in relation to comparable coatings.

The priority in this regard is to obtain high resistance to yellowing on exposure to short-wave UV light in the QUV test (QUV accelerated weathering tester; test according to ASTM G 53-77). To obtain coatings for testing, clear lacquers based on the polyester polyol of Example 1 and the Comparison Example were applied to aluminum panels (68 mm×150 mm) which had been coated with a white base coating. To produce the clear lacquers, the components of Table 1 (except for DBTL and the white pigment), the polyester polyol and blocked polyisocyanate (BL II) were adjusted with Solvesso 200 solvent to a flow viscosity of 70 seconds, applied to pretreated aluminum panels (layer thickness approx. 25 μm) and stoved in a recirculating air oven for about 55 seconds at an oven temperature of 300° C. The lacquered panels were then weather-tested in the QUV accelerated weathering tester (a product of the Q-Panel Company).

In this test, the test specimens were irradiated for 4 hours with intensive unfiltered UV light in the wavelength range from approx. 275 to 370 nm (maximum at 313 nm) and then stored in darkness for 4 h for a total period of 700 h. After the test specimens had been washed down, the total color difference ΔE (in relation to the non-weathered panel) was determined by means of a colorimeter as a measure of the degree of yellowing which has occurred.

The coated panels produced the following values in regard to yellowing and crack formation:

TABLE 2

| Example | 1 | | 2 | | 3 | 4 | | Comparison Example | |
|---|---|---|---|---|---|---|---|---|---|
| Crosslinking component | BL I | BL II | BL I | BL II | BL II | BL I | BL II | BL I | BL II |
| NCO:OH | 1 | 1 | 1 | 1 | 1 | 1 | 1 | 1 | 1 |
| Buchholz hardness | 81 | 94 | 83 | 80 | 73 | 72 | 86 | 94 | 91 |
| Gloss, 20°/60° angle | 56/70 | 63/73 | 58/74 | 69/81 | 76/88 | 56/79 | 76/87 | 58/79 | 78/87 |
| Whiteness | 89 | 89.9 | 89.4 | 89.7 | 84.1 | 86.4 | 88.2 | 88.1 | 87.9 |
| MEK rubbing test | >100 | >100 | >100 | >100 | >100 | >100 | >100 | >100 | >100 |
| Adhesion after 6 mm Erichsen elongation | 0 | 0 | 0 | 0 | 0 | 0 | 0 | 0 | 0 |
| Impact elasticity | 80 | 80 | 80 | 80 | 80 | 80 | 80 | 70 | 10 Cracks |
| T bend test* | | | | | | | | | |
| T 0 | C1H0 | C1H0 | C1H0 | C0H0 | C0H0 | C1H0 | C1H0 | C4H0 | C5H3 |
| T 1 | C0H0 | C0H0 | C0H0 | | | C0H0 | C0H0 | C3H0 | C5H3 |
| T 2 | | C0H0 | | | | | | C1H0 | C5H1 |
| T 3 | | | | | | | | C0H0 | C5H0 |
| T 4 | | | | | | | | | C5H0 |
| T 5 | | | | | | | | | C5H0 |
| mg Abrasion**: | | | | | | | | | |
| 1st measurement | 8.5 | | 2.7 | | | 10.3 | | 20.3 | |
| 2nd measurement | 5.5 | | 3.1 | | | 9.8 | | 21.1 | |

*Order
C0(H0) = best value
C5(H5) = worst value
C = crack formation
H = adhesion
**Weight loss after 500 cycles 500 g of load, CS 10 stones

TABLE 3

| Duration (h) | 100 | 300 | 500 | 700 |
|---|---|---|---|---|
| Total color difference (ΔE), Example 1 | 4.0 | 4.1 | 4.3 | 4.3 |

TABLE 3-continued

| Duration (h) | 100 | 300 | 500 | 700 |
|---|---|---|---|---|
| Total color difference (ΔE), Comparison Example | 3.0 | 8.9 | 10.2 | 10.6 |
| Crack formation, Example 1 | C0 | C0 | C0 | C0 |
| Crack formation, Comparison Example | C0 | C1 | C3 | C4 |

Crack formation:
C0 - no cracks
C1 - few cracks
C5 - overrun with cracks

Discussion of the results:

Crack formation, chalking, bubble formation or staining did not occur with any of the compositions according to the invention.

The results of the color measurements clearly illustrate above all the excellent UV stability of the coatings according to the invention when compared to the comparison coatings.

The white coatings prepared from the coating compositions of Example 1 and the Comparison Example, of which the test results were shown in Table 2, were tested for their weather resistance. The following QUV results were obtained:

TABLE 4

| Duration (h) | | 250 | 500 | 750 | 1000 | 1250 |
|---|---|---|---|---|---|---|
| Total color differences Chalking stages: | | | | | | |
| Example 1, BL I | ΔE = | 0.7 | 1.0 | | 1.5 | 1.1 |
| | K = | | | | | 1 |
| Comparison Example, BL I | ΔE = | 0.5 | 0.9 | 1.0 | | 1.2 |
| | K = | | 1 | 3-4 | 5 | 5 |
| Example 1, BL II | ΔE = | 0.5 | | | 0.8 | 1.1 |
| | K = | | | | 0 | |
| Comparison Example, BL II | ΔE = | 0.7 | 1.2 | | | 1.1 |
| | K = | | 1 | 1-2 | 4 | 5 |

Chalking levels:
0 = best value
5 = worst value

The pigmented coating films also showed a distinct improvement in resistance to UV irradiation for the example according to the invention when compared to the comparison example as reflected in particular in the superior resistance to chalking.

Example 6 (use)

The white lacquers were produced as in Example 6, except that a methanol-etherified melamine resin (Cymel 303, available from American Cyanamid) rather than a blocked polyisocyanate was added as crosslinking agent. The ratio of binder to crosslinking agent was 9:1, based on the solids.

The application to aluminum panels and the stoving conditions correspond to the conditions of Example 5.

Tables 5 and 6 show the results of coating tests and weathering tests for Example 1 when compared to the prior art (Comparison Example).

TABLE 5

| | Example 1 | Comparison Example |
|---|---|---|
| Crosslinking agent | 90:10 | 90:10 |
| Buchholz hardness | 85 | 76 |
| Gloss, 20°/60° angle | 67/81 | 65/76 |
| Whiteness | 88.0 | 85.8 |
| MEK wiping test | >100 | >100 |
| Adhesion | 0 | 0 |
| Impact elasticity | 80 | 80 |
| T bend test | | |
| T 0 | C1 C0 | C4 H5 |
| T 1 | C0 H0 | C1 H1 |

TABLE 5-continued

| | Example 1 | Comparison Example |
|---|---|---|
| T 2 | | C0 C0 |
| mg Abrasion | | |
| value 1 | 4.2 | 33.3 |
| value 2 | 4.3 | 34.5 |

TABLE 6

| Duration (h) | 250 | 500 | 750 | 1000 | 1250 | 1500 |
|---|---|---|---|---|---|---|
| Total color difference (ΔE) | | | | | | |
| Example 1 | 0.2 | 0.6 | | | | 0.8 |
| Comparison Example | 0.2 | 0.7 | | 0.9 | 1.1 | |
| Chalking level (K0-K5) | | | | | | |
| Example 1 | | | | | | K0 |
| Comparison Example | | K0-1 | K5 | | | K5 |
| Gloss, 20°/60° angle | | | | | | |
| Example 1 | 20°<50 | 60 | 65 | 55 | 45 | 40 |
| Comparison Example | 20°<55 | 92 | <60°/67 | 62 | 40 | 30 |

Comparison of the coating properties and UV resistance also shows the superiority of the polyester components according to the invention when compared to those of the prior art when crosslinked with melamine resins. The balanced hardness-to-elasticity ratio, the high abrasion resistance and also the gloss and chalking resistance after exposure to UV light are particularly emphasized.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which is liquid and storable at room temperature and contains a binder which comprises
   A) 2.5 to 40% by weight, based on the weight of components A) and B), of a crosslinking component containing at least one amino resin and/or at least one blocked polyisocyanate and
   B) 60 to 97.5% by weight, based on the weight of components A) and B), of a polyester component containing at least one hydroxyl- and carboxyl-functional polyester, wherein component B) has an average molecular weight ($M_n$) of 500 to 10,000, a hydroxyl value of 20 to 300, an acid value of 1 to 80 and comprises the reaction product of
      a1) at least one dihydric aliphatic or cycloaliphatic $C_{2-12}$ alcohol and
      a2) at least one aliphatic or cycloaliphatic trihydric or higher functionality $C_{3-8}$ alcohol with
      b1) at least one saturated, aliphatic or cycloaliphatic dicarboxylic acid and/or at least one anhydride of such acid and
      b2) at least one olefinically unsaturated, aliphatic or cycloaliphatic dicarboxylic acid containing at least 4 carbon atoms and/or at least one anhydride of such acid, said acid or anhydride being present in an amount sufficient to provide at least 3.2% by weight, based on the weight of component B), of olefinic double bonds (expressed as C=C, molecular weight=24).

2. The coating composition of claim 1 wherein component B) contains a polyester comprising the reaction product of 30 to 50 parts by weight of neopentyl glycol, 1 to 3 parts by weight of ethylene glycol and/or 1,2-propylene glycol, 2 to 10 parts by weight of trimethylol propane, 15 to 35 parts by weight of adipic acid and 20 to 40 parts by weight maleic acid and/or tetrahydrophthalic acid or a corresponding quantity of the corresponding anhydrides.

3. The coating composition of claim 1 wherein component B) has a hydroxyl value of 30 to 100, a carboxyl value of 1 to 10 and an average molecular weight ($M_n$) of 1,000 to 3,000.

4. The coating composition of claim 2 wherein component B) has a hydroxyl value of 30 to 100, a carboxyl value of 1 to 10 and an average molecular weight ($M_n$) of 1,000 to 3,000.

5. A coated substrate which is prepared from a coating composition which is liquid and storable at room temperature and contains a binder which comprises
   A) 2.5 to 40% by weight, based on the weight of components A) and B), of a crosslinking component containing at least one amino resin and/or at least one blocked polyisocyanate and
   B) 60 to 97.5% by weight, based on the weight of components A) and B), of a polyester component containing at least one hydroxy- and carboxyl-functional polyester, wherein component B) has an average molecular weight ($M_n$) of 500 to 10,000, a hydroxyl value of 20 to 300, an acid value of 1 to 80 and comprises the reaction product of
   a1) at least one dihydric aliphatic or cycloaliphatic $C_{2-12}$ alcohol and
   a2) at least one aliphatic or cycloaliphatic trihydric or higher functionality $C_{3-8}$ alcohol with
   b1) at least one saturated, aliphatic or cycloaliphatic dicarboxylic acid and/or at least one anhydride of such acid and
   b2) at least one olefinically unsaturated, aliphatic or cycloaliphatic dicarboxylic acid containing at least 4 carbon atoms and/or at least one anhydride of such acid, said acid or anhydride being present in an amount sufficient to provide at least 3.2% by weight, based on the weight of component B), of olefinic double bonds (expressed as C=C, molecular weight=24).

6. The coated substrate of claim 5 wherein component B) contains a polyester comprising the reaction product of 30 to 50 parts by weight of neopentyl glycol, 1 to 3 parts by weight of ethylene glycol and/or 1,2-propylene glycol, 2 to 10 parts by weight of trimethylol propane, 15 to 35 parts by weight of adipic acid and 20 to 40 parts by weight maleic acid and/or tetrahydrophthalic acid or a corresponding quantity of the corresponding anhydrides.

7. The coated substrate of claim 5 wherein component B) has a hydroxyl value of 30 to 100, a carboxyl value of 1 to 10 and an average molecular weight ($M_n$) of 1,000 to 3,000.

8. The coated substrate of claim 6 wherein component B) has a hydroxyl value of 30 to 100, a carboxyl value of 1 to 10 and an average molecular weight ($M_n$) of 1,000 to 3,000.

* * * * *